United States Patent
Bartolini et al.

(10) Patent No.: US 6,515,794 B2
(45) Date of Patent: Feb. 4, 2003

(54) TECHNIQUES FOR MAKING AN INSERTION LOSS CORRECTION IN AN OPTICAL FIBER AMPLIFIER

(75) Inventors: Glenn D. Bartolini, Waltham, MA (US); Martin Hempstead, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/789,869

(22) Filed: Feb. 20, 2001

(65) Prior Publication Data

US 2002/0044337 A1 Apr. 18, 2002

Related U.S. Application Data

(60) Provisional application No. 60/189,564, filed on Mar. 15, 2000.

(51) Int. Cl.[7] .............................. G02B 6/28; C03B 37/15
(52) U.S. Cl. ...................... 359/337.4; 359/337; 385/27; 385/42
(58) Field of Search .............................. 359/337, 337.4; 385/27, 42, 39

(56) References Cited

U.S. PATENT DOCUMENTS

| | | | | |
|---|---|---|---|---|
| 4,105,959 A | | 8/1978 | Stachejko | 333/31 |
| 5,513,033 A | | 4/1996 | Bricheno et al. | 359/34 |
| 5,553,179 A | | 9/1996 | Cryan et al. | 385/43 |
| 5,812,294 A | * | 9/1998 | Wilson | 359/161 |
| 5,943,155 A | * | 8/1999 | Goossen | 359/247 |
| 5,956,167 A | * | 9/1999 | Iwata et al. | 359/130 |
| 6,166,851 A | * | 12/2000 | Flintham et al. | 359/341 |
| 6,307,691 B1 | * | 10/2001 | Goossen | 359/885 |
| 6,303,885 B1 | * | 10/2002 | Hichwa et al. | 200/181 |

FOREIGN PATENT DOCUMENTS

| | | |
|---|---|---|
| EP | 1017140 | 11/1999 |
| WO | WO 00/41279 | 7/2000 |

* cited by examiner

*Primary Examiner*—Nelson Moskowitz
(74) *Attorney, Agent, or Firm*—Svetlana Short

(57) ABSTRACT

A method of providing a predetermined insertion loss in an optical fiber amplifier, includes the step of utilizing a predetermined, fixed, spectrally-flat loss compound (insertion loss pad, ILP) to pad total optical fiber amplifier insertion loss up to a predetermined fixed level.

8 Claims, 3 Drawing Sheets

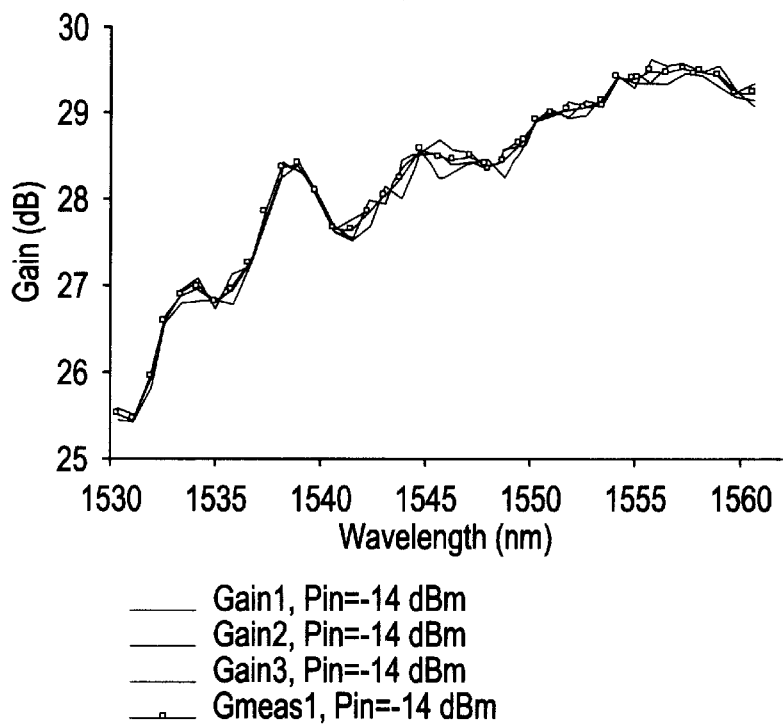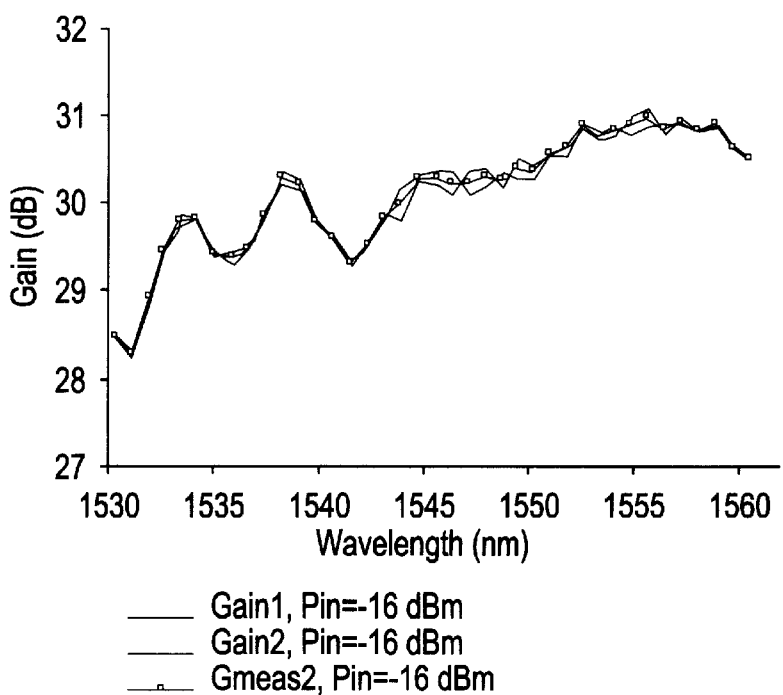

——o—— Optimum tilted gain, Gtilt
——▫—— Gain with ILOS added
———— Measured gain spectrum with ILOS added

TECHNIQUES FOR MAKING AN INSERTION LOSS CORRECTION IN AN OPTICAL FIBER AMPLIFIER

CROSS REFERENCE TO PRIORITY APPLICATION

Reference is made to commonly assigned pending provisional patent application Ser. No. 60/189,564, Filed on Mar. 15, 2000, entitled "TECHNIQUES FOR MAKING AN INSERTION LOSS CORRECTION IN AN EDFA" and is incorporated by reference herein.

FIELD OF THE INVENTION

The present invention relates generally to optical amplifiers. More specifically, the present invention related to optical amplifiers with decreased insertion loss variations and to methods for controlling the insertion loss variation of optical amplifiers.

DESCRIPTION OF THE RELATED ART

A typical terrestrially-deployed OFA (optical fiber amplifier) operates in a signal range of about 1530 nm to about 1560 nm, a region known as the "conventional" or C-Band. It amplifies incoming optical signals, thus providing "gain". The gain G is defined as the ratio of out-coming signal optical power to the in-coming signal optical power. Typical net OFA gain is about 25 dB, and the gain ripple (the gain excursion over the gain band) usually is about 0.5 to 1.5 dB. An OFA may comprise one or more coils of active fiber. The use of such multiple coils in optical fiber amplifiers adds complexity and leads to an increase in both the number of components and number of splices. With added complexity comes increased manufacturing variation among optical amplifiers of the same design as well as increased component insertion loss variation. That is, optical fiber amplifiers built to identical design, due to variation within tolerance limits, have different overall insertion losses. These variations affect OFA performance, with nearly a 1 dB change in gain ripple per 1 dB change in total amplifier insertion loss, an effect caused by a tilt in the gain spectrum (gain as a function of wavelength). Even for optical fiber amplifiers that utilize a variable optical attenuator, compensation of insertion loss variations arising from assembly may consume some of the range of the variable optical attenuator that can be used, otherwise, for some other purpose. In high-performance C-Band optical fiber amplifiers that do not contain a variable optical attenuator (VOA), the component and manufacturing insertion loss variations have to be mitigated in some other way in order to achieve the desired performance.

SUMMARY OF THE INVENTION

According to one aspect of the present invention, a method of providing a predetermined insertion loss in an optical fiber amplifier includes the step of utilizing a predetermined, fixed, spectrally-flat loss component (insertion loss pad, ILP) to bring total optical fiber amplifier insertion loss up to a predetermined fixed level.

According to another aspect of the present invention a method for assembling a plurality of optical amplifiers includes, for each amplifier, the following steps: (i) determining insertion loss requirement; and (ii) providing an insertion loss pad component, with a predetermined insertion loss matching the requirement for that amplifier, such that the insertion loss variation from amplifier to amplifier is less than 0.5 dB.

According to yet another aspect of present invention a method of providing padding insertion loss in an optical amplifier includes the step of utilizing a fixed loss, spectrally flat loss component which brings gain spectrum of said amplifier to a predetermined level.

It is an advantage of the present invention that it provides several methods for determining the value of the insertion loss of this ILP component.

For a more complete understanding of the invention, its objects and advantages refer to the following specification and to the accompanying drawings. Additional features and advantages of the invention are set forth in the detailed description, which follows.

It should be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various features and embodiments of the invention, and together with the description serve to explain the principles and operation of the invention.

BRIEF DESCRIPTION OF THE DRAWINGS

FIG. 4 shows a set of gain curves v. wavelength for an OFA. Three sets of measurements were taken over different polarization input states and these measurements correspond to curves Gain1, Gain2 and Gain3. The curve $G_{meas1}$ is an average of these curves and corresponds to the average gain spectrum of the OFA.

FIG. 5 illustrates a set of two gain curves taken for the same OFA, but with input power reduced by 2 dB. The curve $G_{meas2}$ is an average gain spectrum over polarization.

SPECIFIC EMBODIMENTS OF THE PRESENT INVENTION

The embodiments of the present invention incorporate a technique for adjusting the insertion loss variation of an optical fiber amplifier (OFA) using commercially available equipment and materials. The technique involves the manufacture of a measured high insertion loss offset splice that is fixed to some corresponding insertion loss value.

The first advantage of the OFAs of the disclosed embodiment is that these OFAs can be manufactured with a predetermined, fixed total insertion loss. That is, a plurality of OFAs made to an identical design, can now be made with essentially no variation in total insertion loss from one OFA to another OFA.

Figure 1:
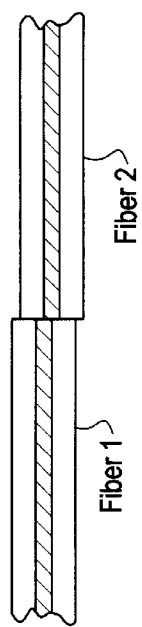
FIG. 1 illustrates schematically the distribution of the insertion loss among optical fiber amplifiers made to an identical design.

The fixed insertion loss (IL) of an OFA includes the passive loss of the optical components (e.g. isolators, hybrids, wavelength division multiplexers, and taps), the background loss of the gain medium (e.g. erbium-doped fiber), and the passive loss of the fiber splices. Due to manufacturing variations in the optical components and IL variations due to the assembly process, typically there is a wide distribution in total insertion loss among OFAs. A typical variation in insertion loss is depicted in FIG. 1.

Figure 2:
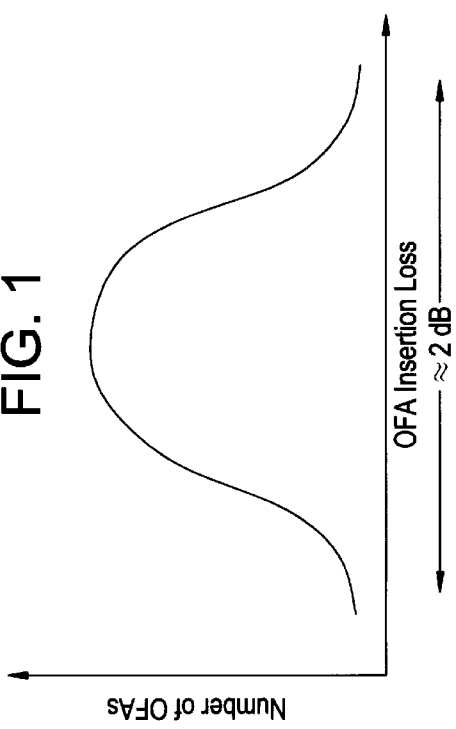
FIG. 2 is a schematic illustration of an exemplary ILP component, in this case an offset splice.
Figure 3:
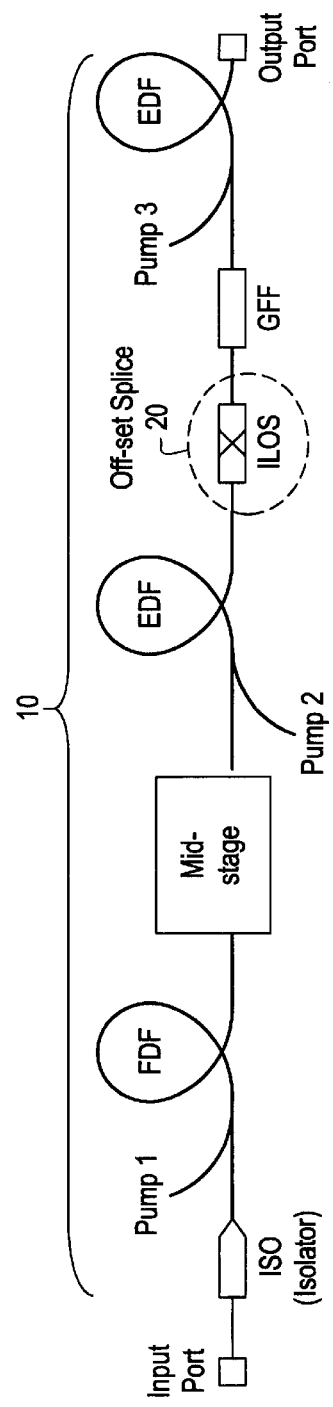
FIG. 3 is a schematic illustration of an optical fiber amplifier utilizing an ILP component insertion loss offset splice (ILOS) element of FIG. 2.

According to one aspect of the present invention, the insertion loss variation can be mitigated by the addition of an insertion loss pad, (ILP) component such as, for example, an insertion loss offset splice (ILOS) in order to compensate and adjust the total IL to some predetermined, fixed target value. More specifically, an insertion loss offset splice may be provided, for example, by 2 similar single mode fibers that are "badly" spliced together, where the splice in addition to providing a predetermined amount of insertion loss, provides no other function. It is preferred that the fibers have been misaligned by about 0.05 $\mu$m to about 5 $\mu$m. This is depicted in FIG. 2. An optical fiber amplifier 10 utilizing such an insertion loss element 20 is shown in FIG. 3.

Several factors can affect the insertion loss determination, including but not limited to polarization dependence of the experimental gain measurement set-up, polarization dependent gain/loss of the amplifier, length variation in the amplifier coils, and the variable loss of connectorized input and output ports. The polarization dependence of the experimental gain measurement set-up and polarization-dependent gain/loss (PDG/PDL) of the amplifier can be mitigated by inserting a polarization scrambler and using the "Min/Max Hold" feature of the optical spectrum analyser (OSA) to measure the maximum and minimum gain excursion over wavelength and polarization. An average gain over polarization can then be determined for all measurements, and used in calculating the insertion loss (IL) value of the ILOS, the exemplary ILP component in this case. Variability of connector insertion loss (IL) when disconnecting/reconnecting the connectors and/or using different pairs of connectors can be reduced by using mated connector pairs with known IL in the manufacturing and measurements processes. Coil length variation will impact the performance of all OFAs, and has a greater impact on gain-flattened OFAs. The ILOS can compensate for some of the coil length variations. The following are two methods for determining the ILOS insertion loss value required, designated LOSS$_{ILOS}$, and a method for manufacturing a splice with this value.

Method for Determining the IL Value of ILOS Using Two Gain Measurements

1. Operate and measure the OFA gain near the predetermined target average gain value, <G$_{target}$>. The measured OFA average gain <Gmeas1> is defined by:

$$\langle G_{meas1} \rangle = 10 \cdot \log \left[ \frac{1}{40} \sum_{N=1}^{40} 10^{[p_{out}^{[1]}(\lambda_N) - p_{in}^{[1]}(\lambda_N)]/10} \right],$$

where N is the channel number centered at the wavelength $\lambda_N$ (here the total number of wavelengths is assumed to be 40), P$_{out}$($\lambda_N$) and P$_{in}$($\lambda_N$) are the output and input powers (in dBm) at wavelength $\lambda_N$, and the gain G at wavelength $\lambda_N$ is defined by the formula G($\lambda_N$)=P$_{out}$($\lambda_N$)-P$_{in}$($\lambda_N$). Note that the superscript number {1} used on P$_{out}$($\lambda_N$) and P$_{in}$($\lambda_N$) refers to the measurement number.

2. Reduce the input power by about 2 to 3 dB (essentially increasing the average gain by 2 to 3 dB) and re-measure the average gain (where the re-measured average gain value is <G$_{meas2}$>) without adjusting the OFA, using the same 40 wavelengths used to find <G$_{meas1}$>.

$$\langle G_{meas2} \rangle = 10 \cdot \log \left[ \frac{1}{40} \sum_{N=1}^{40} 10^{[p_{out}^{[2]}(\lambda_N) - p_{in}^{[2]}(\lambda_N)]/10} \right]$$

3. Using the tilt function $[p_{out}^{[2]}(\lambda_N) - p_{in}^{[2]}(\lambda_N) - p_{out}^{[1]}(\lambda_N) + p_{in}^{[1]}(\lambda_N)]$, adjust the tilt parameter $\xi$ to minimize the gain ripple $\Delta G$ for the tilted gain. G$_{tilt}$ is defined by the following equation.

$$G_{tilt}(\lambda_N) = [p_{out}^{[1]}(\lambda_N) - p_{in}^{[1]}(\lambda_N)] + [p_{out}^{[2]}(\lambda_N) - p_{in}^{[2]}(\lambda_N) - p_{out}^{[1]}(\lambda_N) + p_{in}^{[1]}(\lambda_N)] \cdot \xi,$$

$$\Delta = \max[G_{tilt}(\lambda_N)] - \min[G_{tilt}(\lambda_N)].$$

And the average tilted gain <G$_{tilt}$> is given by, $$\langle G_{tilt} \rangle = 10 \cdot \log \left[ \frac{1}{40} \sum_{N=1}^{40} 10^{G_{tilt}(\lambda_N)/10} \right]$$

4. Determine the LOSS$_{ILOS}$. LOSS$_{ILOS}$ (in dB) is provided by the following equation: LOSS$_{ILOS}$=<G$_{tilt}$>-<G$_{target}$>.

Method of Determining the Insertion Loss Value of the ILOS Using a Known Tilt Function A tilt function T$_f$($\lambda_i$) for each wavelength $\lambda_i$ can be calculated by measurements of the gain spectra of several OFAs and by averaging the gain at each wavelength, as we show in the next equation. Assuming that a 40 channel measurement system has been used to measure two sets of gain curves G$_1$($\lambda_i$) and G$_2$($\lambda_1$) for each of a number M of OFA's the average tilt function can be determined using the following relationship:

$$T_f(\lambda_i) = \frac{1}{M} \sum_{j=1}^{M} \left[ \frac{G_1^j(\lambda_i) - G_2^j(\lambda_i)}{\frac{1}{40} \sum_{N=1}^{40} (G_1^j(\lambda_N) - G_2^j(\lambda_N))} \right]$$

2. In order to determine the ILOS for an OFA using the tilt function T$_f$, several measurements of gain spectrum over polarization should be taken of the OFA. First, operate and measure the OFA gain near the target average gain value, <G$_{target}$> while varying the polarization of wavelength $\lambda_1$. Then calculate the average gain over polarization states. The average gain over polarization at wavelength $\lambda_i$ is calculated from the maximum and minimum output powers (P$_{out}^{max}$ and P$_{out}^{min}$ respectively) and the input power P$_{in}$. ($\lambda_i$) at each wavelength, using the following equation:

$$G_{measlpol}(\lambda) = \left[ \frac{p_{out}^{max}[\lambda_i] + p_{out}^{min}[\lambda_i]}{2} \right] - p_{in}(\lambda_i)$$

3. Using the tilt function T$_f$, adjust the tilt parameter $\xi$ to minimize the gain ripple $\Delta G$ for the tilted gain, $$G_{tilt}(\lambda_i) = G_{measlpol}(\lambda_i) + T_f(\lambda_i) \cdot \xi,$$

where, $$\Delta G = G_{tilt}^{max}(\lambda_{max}) - G_{tilt}^{min}(\lambda_{min}).$$

The average tilted gain <G$_{tilt}$> is provided by the following equation.

$$\langle G_{tilt} \rangle = 10 \cdot \log \left( \frac{1}{40} \sum_{N=1}^{40} 10^{G_{tilt}(\lambda_N)/10} \right).$$

4. Determine LOSS$_{ILOS}$. The LOSS$_{ILOS}$ value (in dB) is provided by the following equation:

$$LOSS_{ILOS} = \langle G_{tilt} \rangle - \langle G_{target} \rangle.$$

Numerical Example

Figure 6:
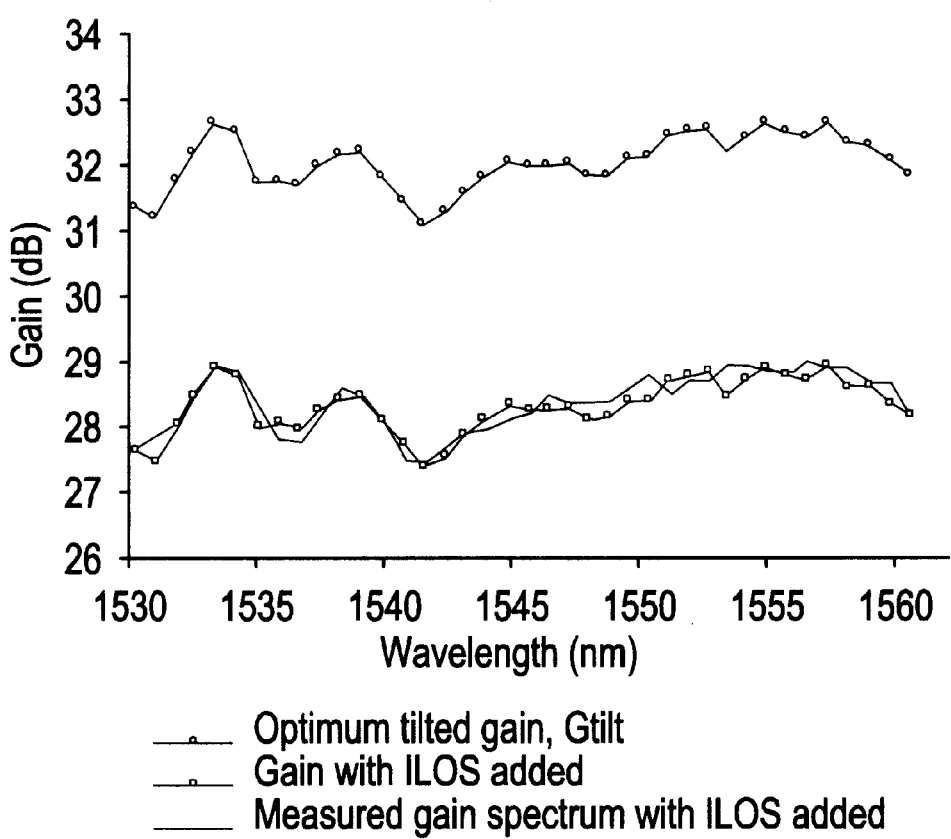
FIG. 6 illustrates an average optimal calculated OFA gain spectrum and a predicted and measured gain spectrum of an OFA with an added ILP component.

FIG. 4 shows a set of gain curves taken for an amplifier with a target average gain <$G_{target}$>=28.30 dB, and a measured average gain <$G_{meas1}$>=28.35 dB. The three measurements corresponding to the curves labeled Gain1, Gain2, Gain3 were taken with a change to the input polarization state between each measurement, and the average gain over polarization was determined, indicated by the curve labeled $G_{meas1}$. That is, the gain spectrum $G_{meas1}$ was measured for an OFA operating near the target gain. The measurement scheme for FIG. 5 is similar to FIG. 4. More specifically, FIG. 5 is a set of gain curves taken for the same OFA with the input power reduced by 2 dB operating under the same pumping conditions as the OFA of FIG. 4. The measured average gain <$G_{meas2}$>=30.16 dB. Note that two measurements were taken with a change to the input polarization state between the measurements, and the average gain over polarization was determined, indicated by the curve "Gmeas2, Pin=−16 dBm" in FIG. 5. FIG. 6 illustrates measured and predicted gain spectrum of an OFA that as may, for example, result from following the procedure in the section "method for determining the IL value of the ILOS using 2 gain measurements". The curve at relatively high gain, with an average gain of 32.03 dB, represents the result of calculating the optimum tilted gain from measurements of a real OFA; the curve indicated by square data points with an average gain of 28.3 dB represents a predicted gain spectrum which is the result of subtracting from the first curve the insertion loss of 3.73 dB calculated for the ILOS, to achieve the desired target gain of 28.3 dB; the curve without data markers, which has an average gain of 28.38 dB, represents the real experimental result when a real ILOS of insertion loss 3.6 dB was inserted into the same OFA as originally measured to generate the first curve with average gain of 32.03 dB. Some of the variation between the predicted and measured gain spectra with the ILOS added can be attributed to polarization effects.

Creating an ILOS Splice

The ILOS of this embodiment of the present invention is an offset splice that is created manually on a standard arc fusion splicer. The insertion loss is monitored by running light of a known power level (at λ=1550 nm) through an SMF-28 fiber placed into the fiber chuck on one side of the fusion splicer. The 1550 nm light output of the fiber end is measured at a fiber-optic power meter with a bare fiber adaptor, and has a value $P_{fiber\_output}$ (in dBm).

The LOSS$_{ILOS}$ value is then measured as LOSS$_{ILOS}$= $P_{fiber\_input}$−$P_{fiber\_output}$.

To create the ILOS using a fusion splicer, the following steps are taken: Load the fibers into the splicer. Move one or both fibers laterally with the X or Y motor until enough offset is achieved to yield the desired attenuation when fusion occurs. The degree of misalignment may be controlled by monitoring the insertion loss $P_{fiber-input}$. −$P_{fiber-output}$. When this reaches a certain predetermined level, not necessarily the same as the desired final IL of the ILOS, the fusion splice is made. The predetermined IL before fusion splicing that indicates the appropriate offset to yield the required loss after splicing can, for example, be determined by trial and error. This is a very repeatable process allowing an accuracy of less than 0.1 dB for LOSS$_{ILOS}$.

Alternatively, an ILP component can be made in situ in the OFA while monitoring the gain spectrum of the OFA This may be done, for example, by arcing a pigtail fiber in a splicer to increase its loss contribution, until the gain spectrum of the OFA is brought down to a predetermined required level, such that multiple amplifiers have a gain variation of less that 0.5 dB from one amplifier to another.

Accordingly, it will be apparent to those skilled in the art that various modifications and adaptations can be made to the present invention without departing from the spirit and scope of the invention. For example, an ILP component may be utilized in non-erbium-doped fiber amplifiers, for example, in Raman amplifiers, Tm-doped amplifiers, planar waveguide amplifiers. In addition, an ILP component may be incorporated in and become a part of another component, for example a gain flattening filter that would provide an additional insertion loss padding function. It is intended that the present invention cover the modifications and adaptations of this invention as defined by the appended claims and their equivalents.

What is claimed is:

1. A method for assembling a plurality of optical amplifiers, said method including the steps of, for each amplifier:

(i) determining insertion loss requirement; and (ii) providing an insertion loss pad component, structured to have a predetermined amount of signal light loss, said component having a predetermined insertion loss matching the requirement for that amplifier, such that the insertion loss variation from amplifier to amplifier is less than 0.5 dB.

2. The method of claim 1, said method further comprising the steps of:

i) for each one of said plurality of optical amplifiers mis-aligning two waveguides such that their optical axis are not co-linear;

ii) coupling light through said two waveguides such that a first pre-determined amount of light propagates from one of said waveguides into another one of said waveguides and a second pre-determined amount of signal light is lost due to said misalignment;

(iii) fusing said mis-aligned waveguides together thereby producing fused mis-aligned waveguides;

(iv) placing at least one of said fused mis-aligned waveguides into each one of said plurality of optical amplifiers; and (v) utilizing at least one of said fused, mis-aligned waveguides to bring total insertion loss for each one of said plurality of optical anplifiers up to a predetermined level.

3. The method of claim 2, said method comprises the step of utilizing two spliced fibers wherein said fibers have optical axis that are misaligned by 0.05 μm to 5 μm.

4. The method of claim 1, utilizing spectral measurements on optical fiber amplifiers to:

(i) measure gain tilt and (ii) to calculate said insertion loss.

5. The method of claim 1, using spectral gain measurements on each individual amplifier at said plurality of amplifiers, at least two gain setting to yield the amplifier tilt.

6. The method of claim 2, wherein said amplifier has gain ripple smaller than the gain ripple when the fused mis-aligned waveguide is removed.

7. The method of claim 1, wherein said insertion loss pad component is a splice loss element, said element providing more than 0.5 dB loss.

8. The method of claim 1, wherein said insertion loss pad component is a spectrally-flat component.

* * * * *